United States Patent [19]

Massey et al.

[11] Patent Number: 5,214,703

[45] Date of Patent: May 25, 1993

[54] DEVICE FOR THE CONVERSION OF A DIGITAL BLOCK AND USE OF SAME

[75] Inventors: James L. Massey, Zurich; Xuejia Lai, Kloten, both of Switzerland

[73] Assignee: Ascom Tech AG, Bern, Switzerland

[21] Appl. No.: 781,235

[22] PCT Filed: May 16, 1991

[86] PCT No.: PCT/CH91/00117

§ 371 Date: Jan. 7, 1992

§ 102(e) Date: Jan. 7, 1992

[87] PCT Pub. No.: WO90/12452

PCT Pub. Date: Oct. 18, 1990

[30] Foreign Application Priority Data

May 18, 1990 [CH] Switzerland .................. 01690/90

[51] Int. Cl.$^5$ ............................................... H04K 1/04
[52] U.S. Cl. ............................................ 380/37; 380/28; 380/42
[58] Field of Search .................. 380/36, 37, 42, 43, 380/45, 49, 50, 28, 29

[56] References Cited

U.S. PATENT DOCUMENTS

| | | | |
|---|---|---|---|
| 4,275,265 | 6/1981 | Davida et al. | 380/29 X |
| 4,668,103 | 5/1987 | Wilson | 380/37 X |
| 4,850,019 | 7/1989 | Shimizu et al. | 380/29 |
| 5,020,106 | 5/1991 | Robold et al. | 380/49 |

Primary Examiner—Tod R. Swann
Attorney, Agent, or Firm—McAulay Fisher Nissen Goldberg & Kiel

[57] ABSTRACT

The device (12) comprises nine encryption stages (61.1, 61.2, 69), the first eight of which are constructed identically. It further comprises a key subblock generation unit (63), an input unit (21), and an output unit (79). It serves for the block-by-block encryption of a plaintext (X) proceeding from a message source (11) into a ciphertext (Y) to be delivered on a transmission line (13), wherein a secret key block (Z) is inputted beforehand via a secure channel 17. The encryption is effected in a step-by-step and parallel manner for four subblocks ($X_1$–$X_4$; $W_{11}$–$W_{14}$; $W_{21}$–$W_{24}$; $W_{81}$–$W_{84}$; $Y_1$–$Y_4$). Every encryption stage (61.1, 61.2, 69) comprises four first inputs (25–28; 35–38), six and four second inputs (29, 30, 32, 33, 49, 52; 129, 130, 132, 133), respectively, and four outputs (75–78). A total of fifty-two key subblocks ($Z_1$–$Z_{52}$) which are formed from the key block (Z) are connected to the second inputs. The device (12) can also serve, without being altered, for the decryption of an incoming ciphertext (Y). Different key subblocks need only be connected to the second inputs for this purpose.

10 Claims, 13 Drawing Sheets

| Stage | X → Y | | Y → X | |
|---|---|---|---|---|
| 1 | $Z_1$ $Z_2$ $Z_3$ $Z_4$ $Z_5$ $Z_6$ | $U_1$ $U_2$ $U_3$ $U_4$ $U_5$ $U_6$ | $Z^{-1}_{49}$ $Z^{-1}_{50}$ $-Z_{51}$ $-Z_{52}$ $Z_{47}$ $Z_{48}$ | |
| 2 | $Z_7$ $Z_8$ $Z_9$ $Z_{10}$ $Z_{11}$ $Z_{12}$ | $U_7$ $U_8$ $U_9$ $U_{10}$ $U_{11}$ $U_{12}$ | $Z^{-1}_{43}$ $Z^{-1}_{44}$ $-Z_{45}$ $-Z_{46}$ $Z_{41}$ $Z_{42}$ | |
| 8 | $Z_{43}$ $Z_{44}$ $Z_{45}$ $Z_{46}$ $Z_{47}$ $Z_{48}$ | $U_{43}$ $U_{44}$ $U_{45}$ $U_{46}$ $U_{47}$ $U_{48}$ | $Z^{-1}_7$ $Z^{-1}_8$ $-Z_9$ $-Z_{10}$ $Z_5$ $Z_6$ | |
| 9 | $Z_{49}$ $Z_{50}$ $Z_{51}$ $Z_{52}$ | $U_{49}$ $U_{50}$ $U_{51}$ $U_{52}$ | $Z^{-1}_1$ $Z^{-1}_2$ $-Z_3$ $-Z_4$ | |

$Z_j \odot Z^{-1}_j = 1$ $-Z_j \boxplus Z_j = 0$

FIG. 10

| Stage | X → Y | Y | Y → X |
|---|---|---|---|
| 1 | $Z_1$ $Z_2$ $Z_3$ $Z_4$ $Z_5$ $Z_6$ | $U_1$ $U_2$ $U_3$ $U_4$ $U_5$ $U_6$ | $Z^{-1}_{49}$ $-Z_{51}$ $-Z_{50}$ $Z^{-1}_{52}$ $Z_{47}$ $Z_{48}$ |
| 2 | $Z_7$ $Z_8$ $Z_9$ $Z_{10}$ $Z_{11}$ $Z_{12}$ | $U_7$ $U_8$ $U_9$ $U_{10}$ $U_{11}$ $U_{12}$ | $Z^{-1}_{43}$ $-Z_{45}$ $-Z_{44}$ $Z^{-1}_{46}$ $Z_{41}$ $Z_{42}$ |
| ... | ... | ... | ... |
| 8 | $Z_{43}$ $Z_{44}$ $Z_{45}$ $Z_{46}$ $Z_{47}$ $Z_{48}$ | $U_{43}$ $U_{44}$ $U_{45}$ $U_{46}$ $U_{47}$ $U_{48}$ | $Z^{-1}_7$ $-Z_9$ $-Z_8$ $Z^{-1}_{10}$ $Z_5$ $Z_6$ |
| 9 | $Z_{49}$ $Z_{50}$ $Z_{51}$ $Z_{52}$ | $U_{49}$ $U_{50}$ $U_{51}$ $U_{52}$ | $Z^{-1}_1$ $-Z_3$ $-Z_2$ $Z^{-1}_4$ |

$Z_j \odot Z^{-1}_j = 1$ $-Z_j \boxplus Z_j = 0$

FIG. 14

DEVICE FOR THE CONVERSION OF A DIGITAL
BLOCK AND USE OF SAME

BACKGROUND OF THE INVENTION

1. Field of the Invention

The invention is directed to a device for the block-by-block conversion of a first digital block into a second digital block using at least one freely selectable control block, each of the blocks having an equal number of digits.

2. Description of the Related Art

Transmission networks using the Data Encryption Standard DES have been in use throughout the world for more than ten years. This DES standard of the American National Bureau of Standards (NBS) is used for block encryption with individually selectable keys (secret key block encryption). Every plaintext block has a length of 64 bits, as does the ciphertext block. A sequence of 64 bits, 56 of which can be freely selected, serves as key (secret key). The transmission of the ciphertext block is effected via a public network.

In general, the Data Encryption Standard DES is a very good encryption tool. However, it is an open, debatable question whether or not the DES Standard has failed to remain secure in the meantime. The small length of the secret key plays an important role in this.

SUMMARY OF THE INVENTION

It is the object of the invention to provide a new kind of block encryption which is improved over the DES and which could be introduced as a European Standard. This kind of block encryption will make use of all known encryption techniques of confusion, diffusion, etc. and, above all, will use a longer key providing first input means for receiving at least two initial subblocks, wherein the initial digital block is subdivided to form the initial subblocks. Each of the initial subblocks have m digits. A second input means is provided for receiving at least two control blocks, each control block also having m digits. Logic means perform serial operations of at least two different types upon the initial subblocks and the control blocks. The logic means include at least four operation units, each having first and second inputs for receiving blocks to be operated upon and an output for sending an output block resulting from the logical operation performed. The blocks operated upon and the output block each have m digits. The blocks operated upon by the operation units include the initial subblocks, the control blocks, and the output blocks.

The majority of the operation units are arranged so that the operation unit which operates upon the output block of a previous operation unit performs an operation different from that of the previous operation unit. The operation units perform the operations selected from and and . Output means are provided for transmitting at least two final subblocks, the final subblocks forming the assigned final digital block, wherein the final subblocks are converted blocks which correspond to the initial subblocks.

BRIEF DESCRIPTION OF THE DRAWINGS

The invention is described in more detail in the following by way of example with reference to fourteen diagrams:

FIG. 4 shows a truth table of operation units of a first kind;

FIG. 5 shows a truth table of operation units of a second kind;

FIG. 10 shows a table of key subblocks and decryption subblocks;

FIG. 14 shows a second table of key subblocks and decryption subblocks.

DESCRIPTION OF THE PREFERRED EMBODIMENTS

Figure 1:
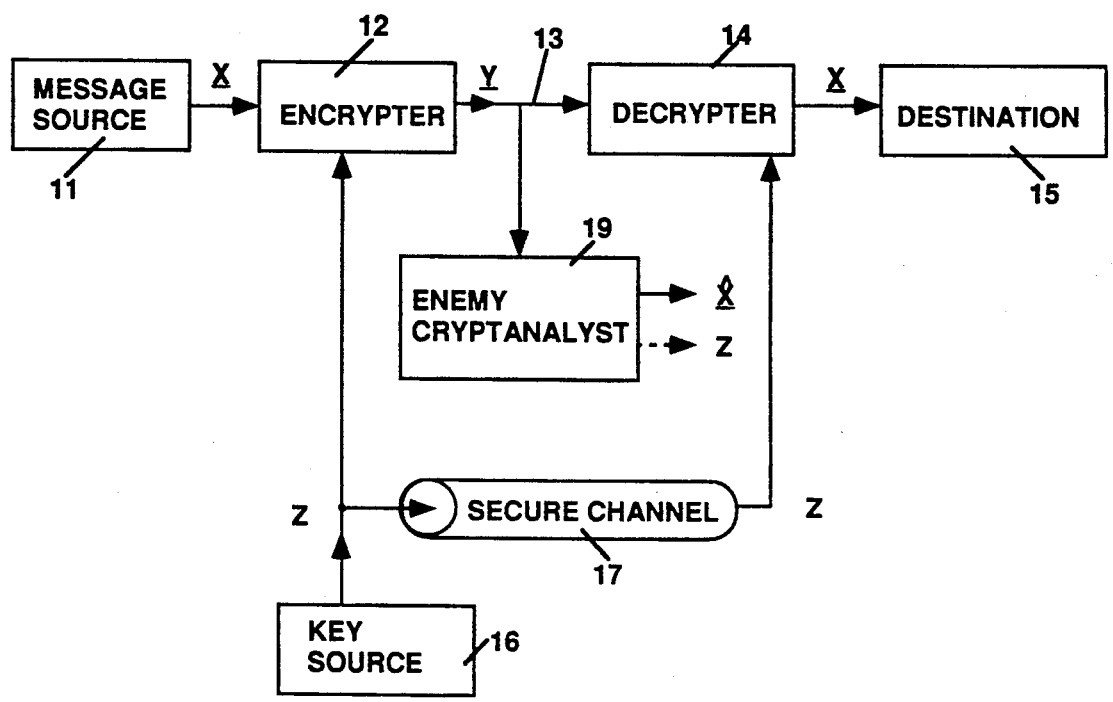
FIG. 1 shows a basic block wiring diagram of a device for the transmission of data in encrypted form.

FIG. 1 shows a basic block wiring diagram of a device for the transmission of data in encrypted form. The data (plaintext X) to be transmitted originate in a message source 11, e.g. a computer. These data are encrypted in an encrypter 12 and transmitted as ciphertext Y on a public network transmission line 13. The ciphertext Y reaches a decrypter 14 on the receiver side which feeds it to a destination 15, e.g. a second computer, in decrypted form.

For encryption and decryption of the data, the encrypter 12 and the decrypter 14 use a secret key block Z which is provided by means f a key source 16 and supplied via secure channel 17 to the two units 12, 14. This channel 17 is e.g. a courier with sealed cover.

The ciphertext Y on the transmission line 13 is always exposed to the risk that an enemy cryptanalyst 19 will also read this text Y and attempt to obtain the assigned plaintext X or the key block Z (The results of these attempts are designated $\hat{X}$ and $\hat{Z}$). The cipher should be resistant to these attempts in principle, at least for a sufficient length of time.

Figure 2:
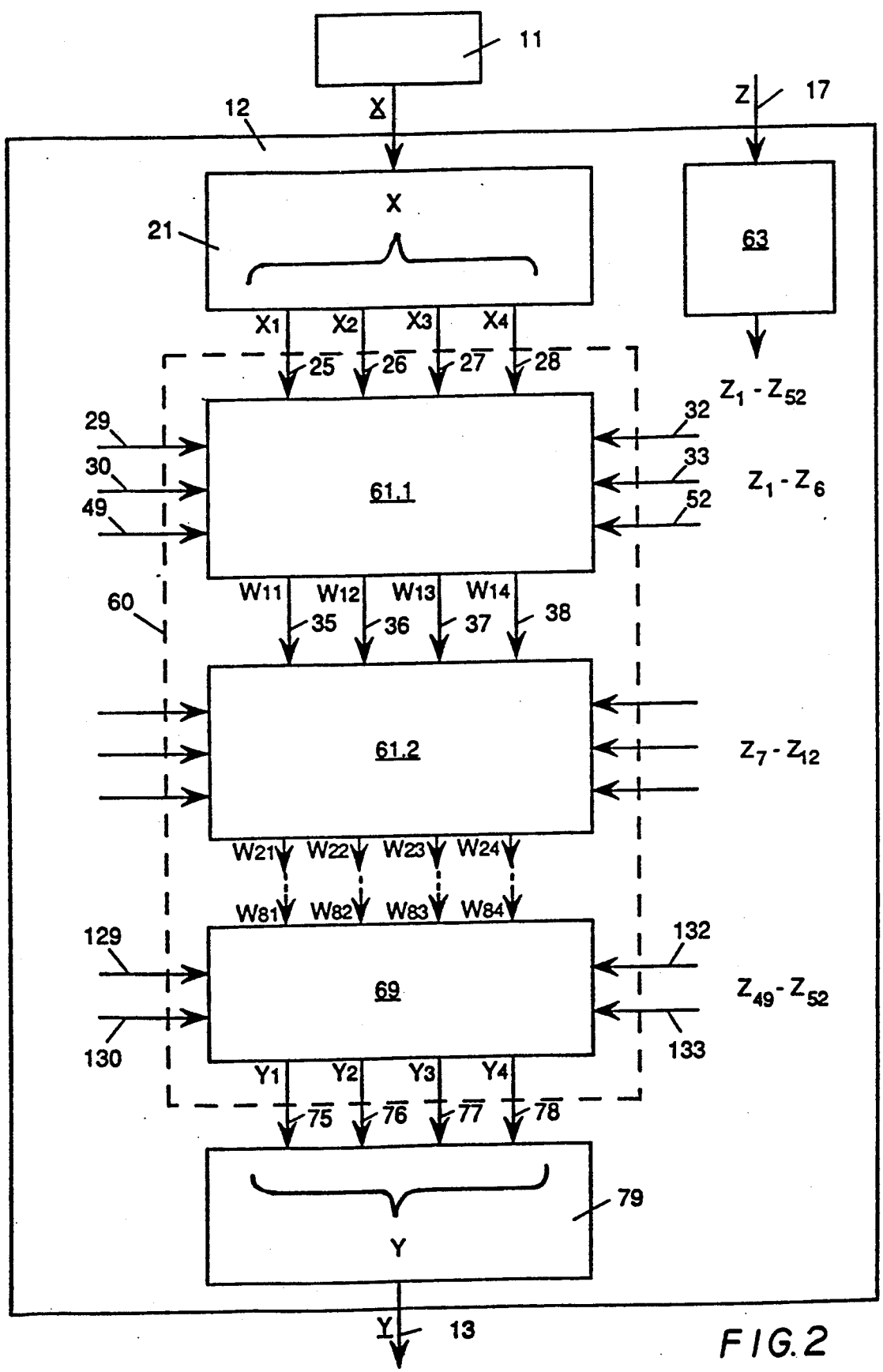
FIG. 2 shows a block wiring diagram of an encrypter.

FIG. 2 shows a block wiring diagram of the encrypter 12 in the case of a step-by-step block encryption. The plaintext X to be encrypted arrives continuously from the message source 11 and reaches an input unit 21, e.g. a series/parallel converter in the case of a serial bit stream. In a step-by-step manner, this input unit 21 assembles plaintext blocks X of preferably N=64 bits (first length) which are partitioned into four subblocks $X_1$, $X_2$, $X_3$, $X_4$, each of m=16 bits (second length). These plaintext subblocks of the respective plaintext blocks X reach a first encryption stage 61.1 via first inputs 25 to 28, each consisting of sixteen parallel lines. In this stage 61.1, the subblocks $X_1$ to $X_4$ are grouped together with six different control blocks by means of suitable logical functions. During the encryption process, the (general) control blocks are (special) key subblocks $Z_1$ to $Z_6$, and during the decryption process they are decryption subblocks $U_1$ to $U_6$, which are derived from the key block Z. This will be discussed in more detail later. The encryption process is described primarily in the following, for which reason the term key subblock is preferred.

The key subblocks $Z_1$ to $Z_6$ are connected to second inputs 29, 30, 32, 33, 49, 52 of the first encryption stage 61.1. They, as well as additional key subblocks $Z_7$ to $Z_{52}$, are delivered by a key subblock generation unit 63. This unit 63 receives, via the secure channel 17, the desired key block Z which preferably forms a sequence of K=128 bits.

The method for obtaining the key subblocks $Z_1$ to $Z_8$ from the key block Z consists in that the latter is divided into eight identical parts of 16 bits length each. The 128 bits of the key block Z are then cyclically shifted (cyclically exchanged) by 25 bits in a uniform direction, e.g. to the left, and the new sequence of 128 bits which is thus formed is, in turn, divided into eight identical parts for forming the key subblocks $Z_9$ to $Z_{16}$, and so forth, until the formation of $Z_{52}$. Every key subblock $Z_1$ to $Z_{52}$ accordingly has a (second) length m of 16 bits, is derived in an unequivocal manner from the key block Z and is generally distinguished from every other key subblock.

The key subblocks $Z_1$ to $Z_6$ are connected to the aforementioned six second inputs 29, 30, 32, 33, 49, 52 of the first encryption stage 61.1. The result of the grouping together in this stage 61.1 appears at four outputs or connections 35 to 38, specifically as four first intersubblocks $W_{11}$, $W_{12}$, $W_{13}$, $W_{14}$ of m=16 bits in each instance, which together form a first interblock $W_1$ of the (first) length N=64 bits.

The first intersubblocks $W_{11}$ to $W_{14}$ are connected to the connections or inputs 35 to 38 (identical to the outputs of the preceding stage 61.1) of a second encryption stage 61.2 for the second encryption step. This encryption stage 61.2 is constructed so as to be identical to the first encryption stage 61.1. The described key subblocks $Z_7$ to $Z_{12}$ are connected to their six second key inputs, and the second intersubblocks $W_{21}$, $W_{22}$, $W_{23}$, $W_{24}$ or the second interblock $W_2$, in its entirety, appear at their outputs.

The second intersubblocks $W_{21}$ to $W_{24}$ are connected to a third encryption stage, not shown, for the third encryption step; the third intersubblocks $W_{31}$ to $W_{34}$ are connected to a fourth encryption stage, etc. up to a ninth encryption stage 69 which is different from the preceding stages and comprises four second inputs 129, 130, 132, 133.

Finally, four ciphertext subblocks $Y_1$, $Y_2$, $Y_3$, $Y_4$ of the second length m=16 bits, which together form a ciphertext block Y which is assigned to the respective plaintext block X in a complicated but unequivocal manner, appear at the outputs 75 to 78 of the ninth stage 69. This ciphertext block Y is converted in an output unit 79, e.g. a parallel/series converter, in such a way that it can be transmitted on the transmission line 13.

The encryption process is accordingly effected in nine successive encryption stages 61.1, 61.2, 69, the first eight of which are identical. The total of fifty-two aforementioned different key subblocks $Z_1$ to $Z_{52}$ serve as a key. The encryption unit 60 necessary for the encryption process X→Y is indicated in a dashed line in FIG. 2.

The encryption stages 61.1, 61.2, 69 can be realized in various ways. First, a so-called software implementation can be provided, in which one or more processors work according to a predetermined program. For example, each input (e.g. the first inputs 25 to 28) can be assigned their own processor which takes into account the m=16 parallel lines of every input in a serial manner. On the other hand, a hardware implementation can also be provided in which the logical function elements are in the form of independent circuit units. The latter are then either constructed from discrete chip elements or preferably from several largescale integration modules (very large scale integration VLSI). In the hardware implementation, all lines of all inputs are preferably processed in parallel. However, a partial series procedure is also possible in this case in that e.g. the different inputs (e.g. 25 to 28) are serially connected to partial central circuit units via multiplexers.

The hardware implementation has the advantage over the software implementation that it can work substantially faster, specifically up to clock frequencies of approximately 100 Mbits/s and more. For this reason and for purposes of description, the hardware implementation for the encryption stages 61.1, 61.2, 69 is emphasized in the following.

Figure 3:
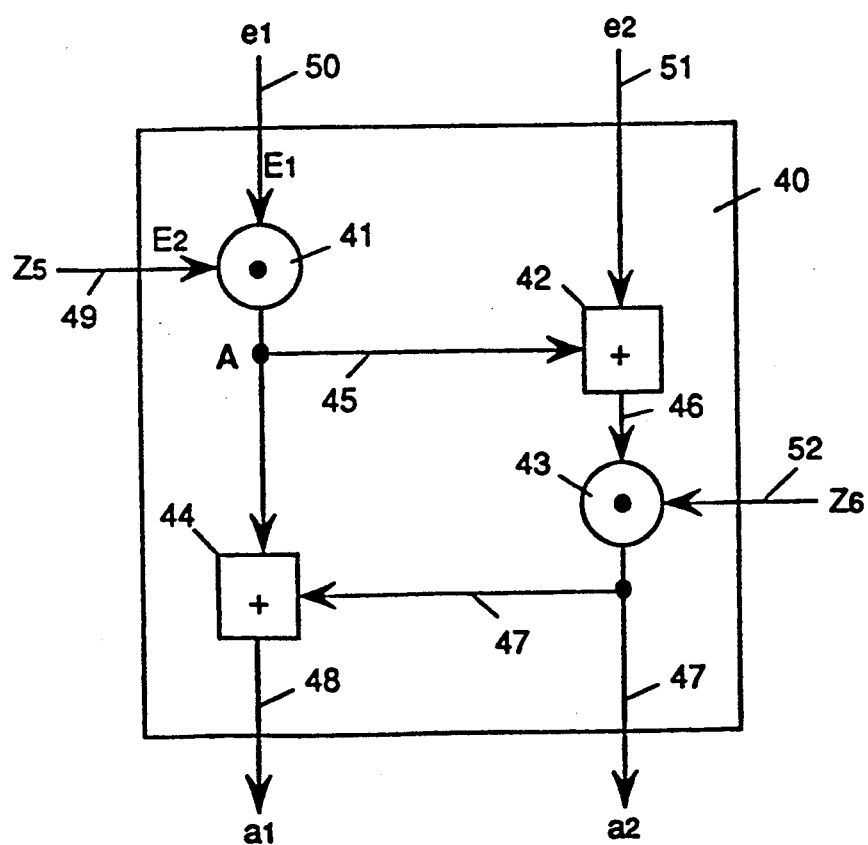
FIG. 3 shows a block wiring diagram of a primary encryption logic.

FIG. 3 shows the block wiring diagram of a primary encryption logic 40. This logic comprises four operation units 41 to 44 of two different kinds which are connected with one another by means of three connections 45 to 47, the last (47) of which simultaneously forms an output of the logic 40. In addition, there is another output 48 and two first inputs 50, 51 and two second inputs 49, 52 of the logic 40.

Every operation unit 41 to 44 has two inputs and an output. Every input and output is constructed as a 16-bit parallel input or output, to which a 16-bit block is connected in a bit-parallel manner. In a corresponding manner, the operation units 41 to 44 are constructed for the logical joining of two input blocks $E_1$, $E_2$, in each instance, and for forming an assigned output block A of 16 bits. By nature of the method, the operation units are connected one after the other in four stages, wherein the two kinds of units 41 to 44 alternate.

The operation units of the first kind, i.e. the units 42 and 44, have the following characteristics: these units interpret every input block $E_1$, $E_2$ as an integer in binary representation, wherein this number belongs to the number set or set $\{0, 1, 2, \ldots, (2^m-1)\}$ (the number m (second length) is preferably the number 16, but can also be 4 or 8). The units 42, 44 then form the sum modulo $2^m$ from the input blocks $E_1$, $E_2$ and deliver a corresponding output block A. The operation units 42, 44 of the first kind are accordingly adder modulo $2^m$.

Figures 4, 5:
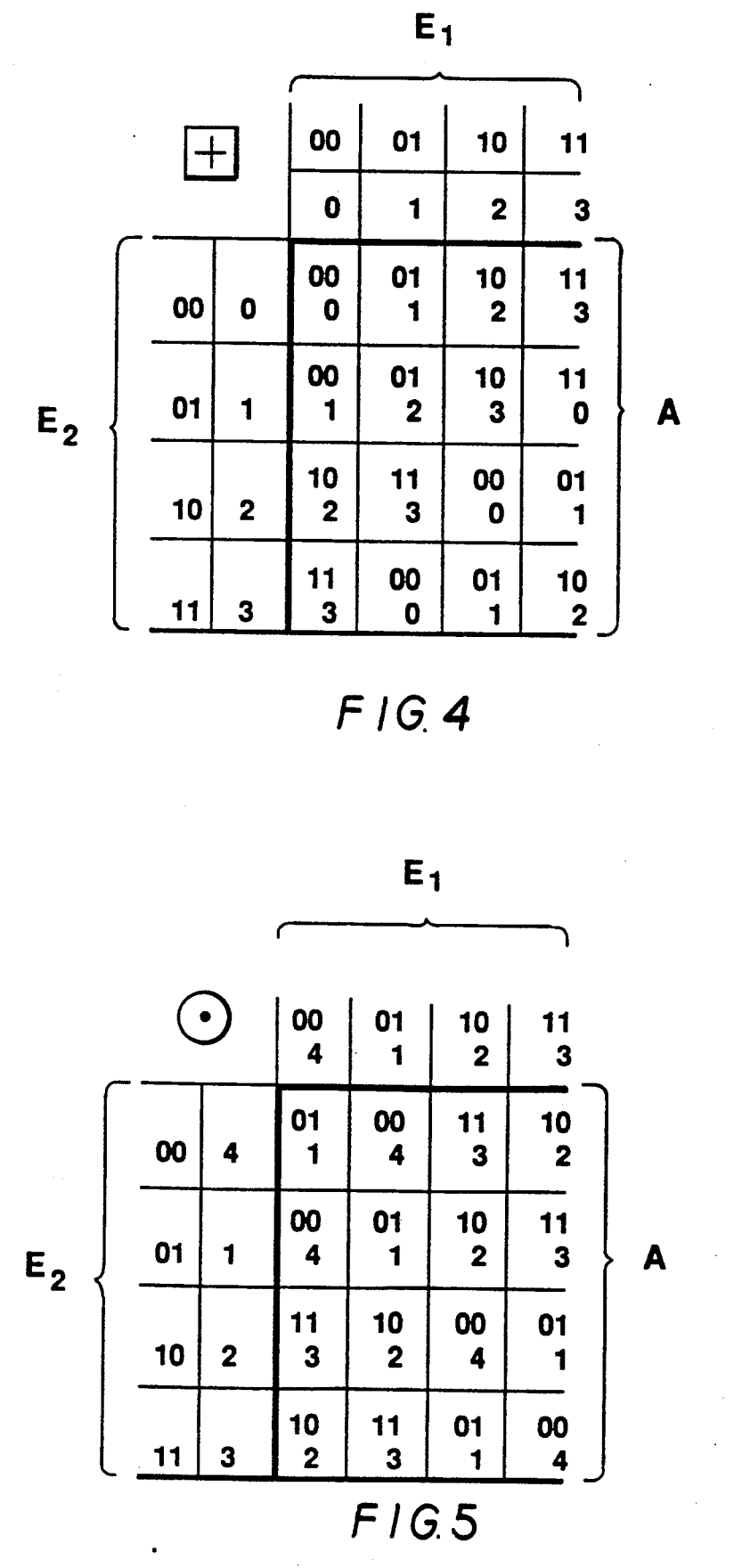

FIG. 4 shows the truth table for this first kind of operation unit 42, 44, specifically as an example for m=2. The two input blocks $E_1$, $E_2$ and the output block A are delivered, respectively, as a number in binary and decimal representation.

The operation units 41, 43 of the second kind have the following characteristics: these units interpret the block whose bits are all zero as an integer $2^m$. Otherwise, it interprets the blocks as integers in binary representation, wherein these numbers belong to the number set or set $\{1, 2, 3, \ldots, (2^m-1)\}$, where m=4, 8 or 16. The respective output block A is then the product modulo $(2^m+1)$ of the input blocks $E_1$, $E_2$. The units 41, 43 are accordingly multiplier modulo $(2^m+1)$. FIG. 5 shows the truth table for this second kind of operation unit 41, 43 for m=2, again as an example and corresponding to the truth table of FIG. 4.

The primary encryption logic 40 effects a very good diffusion, since each of its two output blocks $a_1$, $a_2$ depends on the two input blocks $e_1$, $e_2$ and on the two key subblocks $Z_5$, $Z_6$, that is on the values at all inputs. It can be proved that the quantity of four operations is a minimum for meeting the object of diffusion. The aforementioned use of operation units of different kinds serves to produce the necessary confusion.

Figure 6:
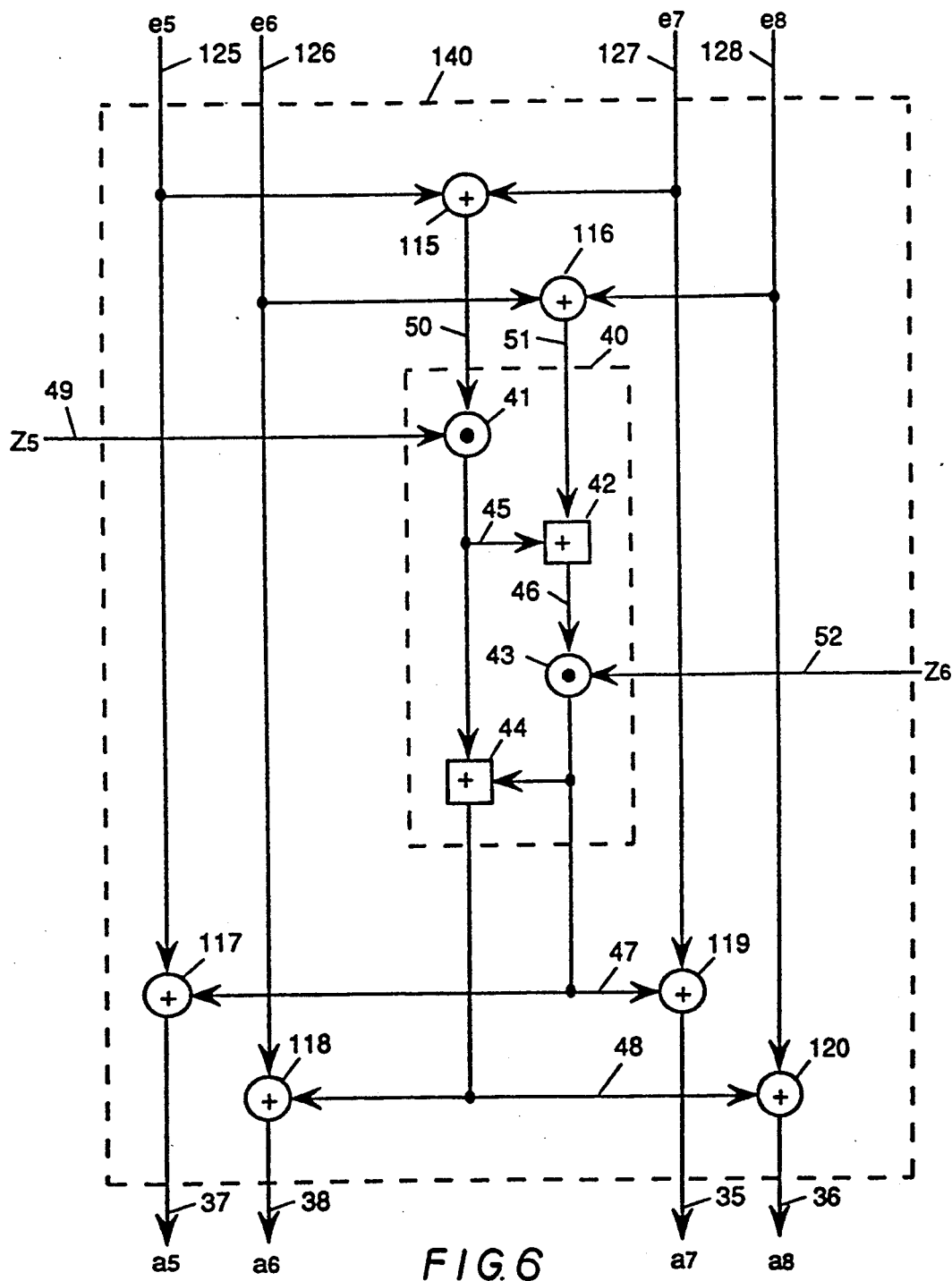
FIG. 6 shows a block wiring diagram of an extended encryption logic.

FIG. 6 shows the block wiring diagram of an extended encryption logic 140. This encryption logic comprises four first inputs 125 to 128 for four input blocks $e_5$ to $e_8$ to be encrypted in a parallel manner, four outputs 35 to 38 for delivering four output blocks $a_5$ to $a_8$, and two second inputs 49, 52, Which have already been mentioned, for the input of two key subblocks $Z_5$, $Z_6$.

The core of the extended encryption logic 140 is formed by the primary logic 40, which was already described. This is supplemented by six operation units 115 to 120 of a third kind , specifically in such a way that the input 125 leads to the units 115 and 117, the input 126 leads to the units 116 and 118, the input 127 leads to the units 115 and 119, the input 128 leads to the units 116 and 120, the outputs of the units 15 and 116 form the inputs 50 and 51, respectively, of the logic 40, the outputs 47, 48 of the logic 40 form the inputs of the units 117, 119 and 118, 120, respectively, and the outputs of the units 117 to 120 form the outputs 35 to 38. With respect to function, the extended encryption logic 140 is constructed in such a way that every output 35 to 38 depends on all inputs 125 to 128 and 49, 52, that operation units of different kinds , , follow one another and the characteristic of the involution is given. This last characteristic means that the extended encryption logic 140 is a self-inverse function for the blocks $e_5$ to $e_8$ connected to their first inputs 125 to 128, specifically for every given pair of key subblocks $Z_5$, $Z_6$.

Figure 7:
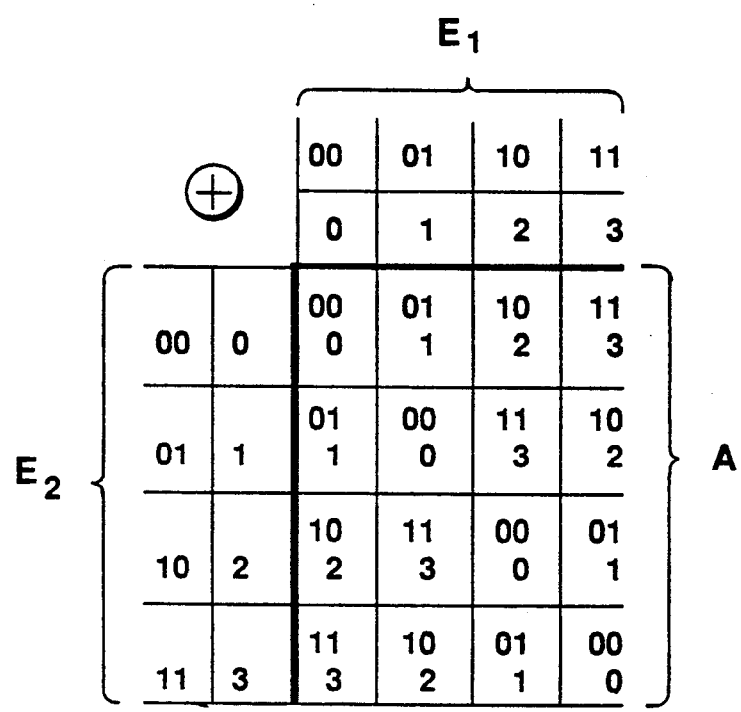
FIG. 7 shows a truth table of operation units of a third kind.

Bit-by-bit exclusive-OR, as is known from the aforementioned DES standard, is preferably used as operation units 115 to 120 of the third kind . FIG. 7 shows the truth table for a bit-by-bit exclusive-OR and m=2 corresponding to FIGS. 4 and 5, again only as an example to demonstrate function.

Figure 8:
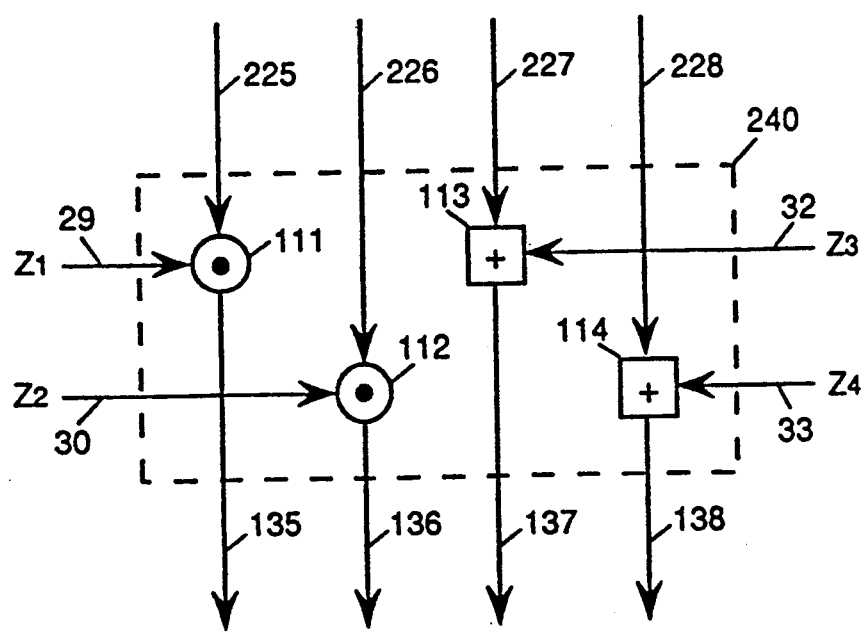
FIG. 8 shows a block wiring diagram of a supplementary encryption logic.

FIG. 8 shows the block wiring diagram of a supplementary encryption logic 240. The latter comprises two operation units 111, 112 of the second kind and two operation units 113, 114 of the first kind . Their inputs are a first input 225 to 228 for the input of an input block $e_n$ and a second input 29, 30, 32, 33 for the input of a key subblock $Z_n$ (n=1 ... 4). The outputs of the logic 240 are identical to the outputs 135 to 138 of the operation units 111 to 114.

Figure 9:
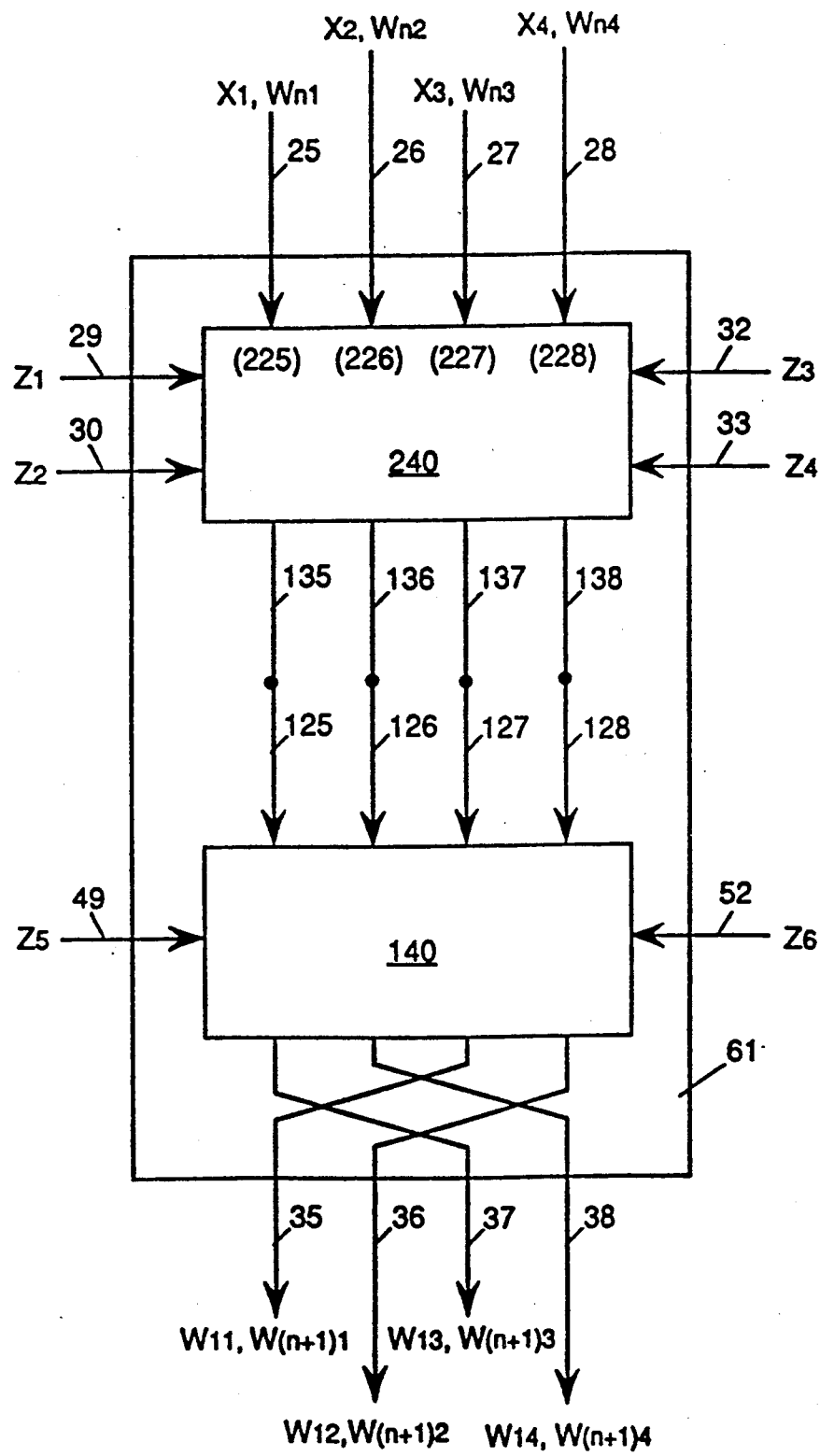
FIG. 9 shows a block wiring diagram of an encryption stage.

FIG. 9 shows the block wiring diagram of one of the first eight identical encryption stages of FIG. 2, e.g. the first stage 61.1. Accordingly, this encryption stage is formed from the combination of a supplementary encryption logic 240 and an extended encryption logic 140, wherein the outputs 135 to 138 of the logic 240 are directly (galvanically) connected with the inputs 125 to 128 of the following logic 140. The inputs 25 to 28 of the respective encryption stage (61.1) are identical to the inputs 225 to 228 of the supplementary encryption logic 240. The outputs of the extended logic 140, when crossed, form the outputs 35 to 38 of the encryption stage 61.1. Six key subblocks, e.g. blocks $Z_1$ to $Z_6$, are connected to the second inputs 29, 30, 32, 33, 49, 52, and either four plaintext subblocks $X_1$ to $X_4$ or four intersubblocks $W_{n1}$ to $W_{n4}$ are connected to the first inputs 25 to 28. The intersubblocks $W_{11}$ to $W_{14}$ and $W_{(n+1)1}$ to $W_{(n+1)4}$, respectively, are delivered in an assigned manner to the outputs 35 to 38 (with n=1, 2, ... 7).

The ninth encryption stage 69 corresponds exclusively to the supplementary encryption logic 240, wherein the four outputs 135 to 138 of this logic 240 are identical to the four outputs 75 to 78 of the encryption stage 69.

The encryption unit 60 (FIG. 2), as overall logic for the encryption of plaintext blocks X which correspond to a sequence of 64 bits in each instance, comprises the following characteristics as a whole:

It comprises four first inputs 25 to 28, fifty-two second inputs 28, 29, 30, 32, 33, 49, 52 and four outputs 75 to 78.

It comprises eight identical encryption stages 61.1, 61.2, plus another encryption stage 69.

It comprises one hundred and sixteen operation units of a total of three different kinds , , .

The kinds , , of successive operations alternate in general and continuously in the flow direction of the logical operations.

It is suitable both for the encryption of plaintext blocks X and for the decryption of ciphertext blocks Y.

Every block at the outputs 75 to 78 is dependent on all blocks at the first inputs 25 to 28 and on almost all blocks at the second inputs 29, 30, 32, 33, 49, 52, on a total of fifty-three blocks. (The output blocks of three respective blocks connected to the second inputs 129, 130, 132, 133 of the ninth encryption stage 69 are not dependent.)

In each of the first eight encryption stages 61.1, 61.2 of the encryption unit 60, every bit of every block $W_{(n+1)1}$ to $W_{(n+1)4}$ at the outputs 35 to 38 is dependent on all bits of all blocks $W_{n1}$ to $W_{n4}$ and $Z_n$ at the first (25 to 28) and second inputs 29, 30, 32, 33, 49, 52, respectively.

As a result of the aforementioned characteristics, an encryption unit 60 can serve either for the encryption of a plaintext block X or for the decryption of a ciphertext block Y. The unit 60 can accordingly be used for the encryption process X→Y as well as for the decryption process Y→X.

The key block Z used for the encryption process and the fifty-two key subblocks $Z_1$ to $Z_{52}$ derived from this have already been described. FIG. 10 no shows fifty-two decryption subblocks $U_1$ to $U_{52}$ which are used for the decryption process Y→X, specifically in comparison to the key subblocks $Z_1$ to $Z_{52}$ and in relation to these key subblocks and to the nine encryption stages 61.1, 61.2, 69 (FIG. 2).

During the encryption X→Y, the key subblocks $Z_1$ to $Z_6$ are used in the first stage, the blocks $Z_7$ to $Z_{12}$ are used in the second stage, and so on. Finally, in the ninth stage, blocks $Z_{49}$ to $Z_{52}$ are used.

The following applies for every stage i in the decryption Y→X:

The first two decryption subblocks of every stage i (i=1, 2 ... 9) of the decryption process Y→X are identical to the modulo $(2^{16}+1)$ multiplication inverses of the first and second key subblocks, respectively, in the (10i)th stage of the encryption process X→Y. This means, e.g. for the first two decryption subblocks $U_1$, $U_2$ of the first stage:

$$U_1 = Z^{-1}_{49}; \quad U_2 = Z^{-1}_{50}.$$

The third and fourth decryption subblocks in the i-th stage (i=1, 2 ... 9) of the decryption process Y→X are the negative values of the modulo $(2^{16}+1)$ addition of the third and fourth key subblock in the (10-i)th stage of the encryption process X→Y. This means, e.g. for decryption subblocks $U_3$, $U_4$ of the first stage:

$$U_3 = -Z_{51}; U_4 = -Z_{52}.$$

The fifth and sixth decryption subblocks in the ith stage (i=1, 2 ... 8) of the decryption process Y→X are identical to the fifth and sixth key subblocks, respectively, in the (9-i)th stage of the encryption process X→Y. E.g. for decryption subblocks $U_5$, $U_6$ of the first stage, this means:

$$U_5 = Z_{47}; U_6 = Z_{48}$$

In this instance, $Z^{-1}_j$ modulo ($2^{16}+1$) multiplied by $Z_j$ is 1. Further, $-Z_j$ modulo $2^{16}$ added to $Z_j$ is 0.

The invention allows a large number of variants. Some of these are listed as follows:

Other kinds of operation units 42 to 44, 111 to 114, 115 to 120 are used.

The different kinds of operation units 41 to 44, 111 to 114, 115 to 120 are divided differently in the various aforementioned logics 40, 240, 140. For example, the operation units of the two kinds , are exchanged in the primary encryption logic 40. But it is also possible to provide a primary encryption logic 40 of a more extensive construction and/or to omit the second inputs 49, 52 in such a variant.

Less than or more than eight identical encryption stages 61.1, 61.2 are used. In general, a first plurality S of stages is provided, to which a second plurality T of key subblocks is then assigned. T=6·S+4 is the relation between T and S. In this general case, the following applies for the relationships between the decryption subblocks $U_1$ and $U_T$ and the key subblocks $Z_1$ to $Z_T$:

the first two decryption subblocks of every stage i (i=1, 2 ... (S+1)) are identical to the modulo ($2^m+1$) multiplication inverses of the first or second key subblock of the first or second key subblock in the (S-i+2)th stage of the encryption process, the third and fourth decryption subblocks in the ith stage (i=1, 2 ... (S+1) are identical to the modulo $2^m$ addition inverses of the third or fourth key subblock in the (S-i+2)th stage of the encryption process, and the fifth and sixth decryption subblocks in the ith stage (i=1, 2 ... S) are identical to the fifth and sixth key subblock, respectively, in the (S-i+1)th stage of the encryption process.

The principle that the kinds , , of immediately succeeding operation units are different can be discarded. However, it is advantageous if at least the overwhelming majority of all pairs of directly successive operations consist of two operations of different kinds , , .

The derivation of the key subblocks $Z_1$ to $Z_{52}$ from the key subblock Z is effected according to a method other than that described.

The construction of the encryption unit 60 is effected predominantly with the use of discrete operation units 41 to 44, 111 to 114, 115 to 120 as special logic units (hardware implementation), predominantly with the use of commercially available processors and storages, which work according to an assigned program (software implementation) or in mixed construction.

Each of the described logics 40, 140, 240, 60, 61.1, 61.2, 69 can be conceived as a "black box" with first and second inputs and outputs. Each of these logics converts the two or four first subblocks connected to the first inputs into assigned second subblocks of the same length which can be tapped at the outputs. The conversion process is influenced by the key subblocks connected to the second inputs or in general by suitable control blocks. Parallel inputs and outputs are advantageous if higher working speeds are desired. An individual first and second input and an individual single output are preferably to be provided for said software implementation, the assigned input and output blocks being inputted and outputted serially by means of them.

It is decisive for the conversion process that the (second) length m be either 4, 8 or preferably 16 bits.

Aside from the characteristics mentioned in connection with the object of the invention, the invention comprises the advantageous additional characteristic that it is relatively uncomplicated in construction and works quickly and without disturbances in both the hardware and software version. The encryption logics 40, 140, 240 can be constructed from VLSI semiconductor modules (VLSI very large scale integration) and can accordingly be inexpensively produced.

A concrete additional variant is described in the following with reference to FIGS. 11 to 14 which are modifications of FIGS. 8, 9, 2 and 10.

Figure 11:
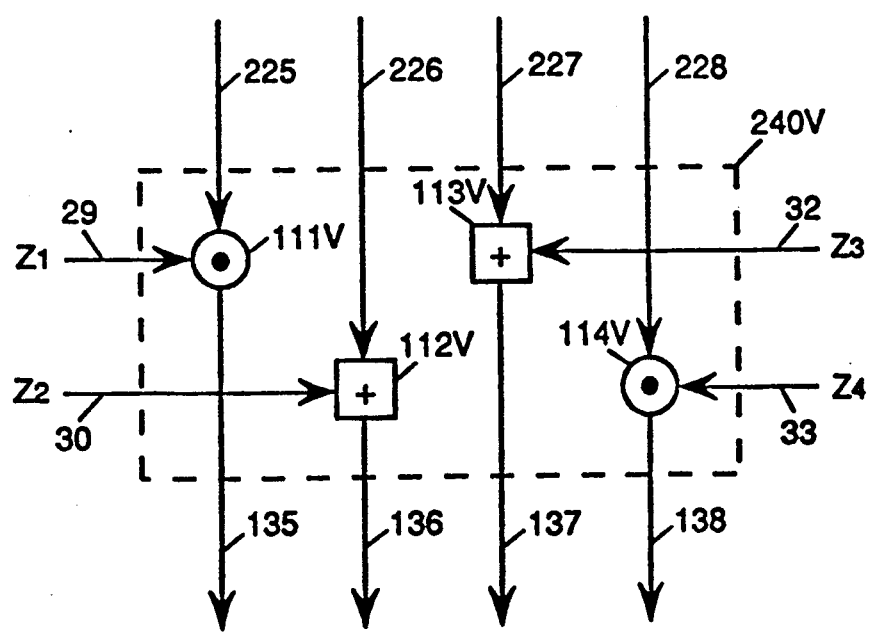
FIG. 11 shows a block wiring diagram of a second supplementary encryption logic.

FIG. 11 shows the block wiring diagram of a second supplementary encryption logic 240v. The latter comprises two operation units 111v, 114v of the second kind and two operation units 112v, 113v of the first kind . Their inputs are each a first input 225 to 228 for the input of an input block $e_n$ and a second input 29, 30, 32, 33 for the input of a key subblock $Z_n$ (n=1 ... 4). The outputs of the logic 240 are identical to the outputs 135 to 138 of the operation units 111v to 114v.

Figure 12:
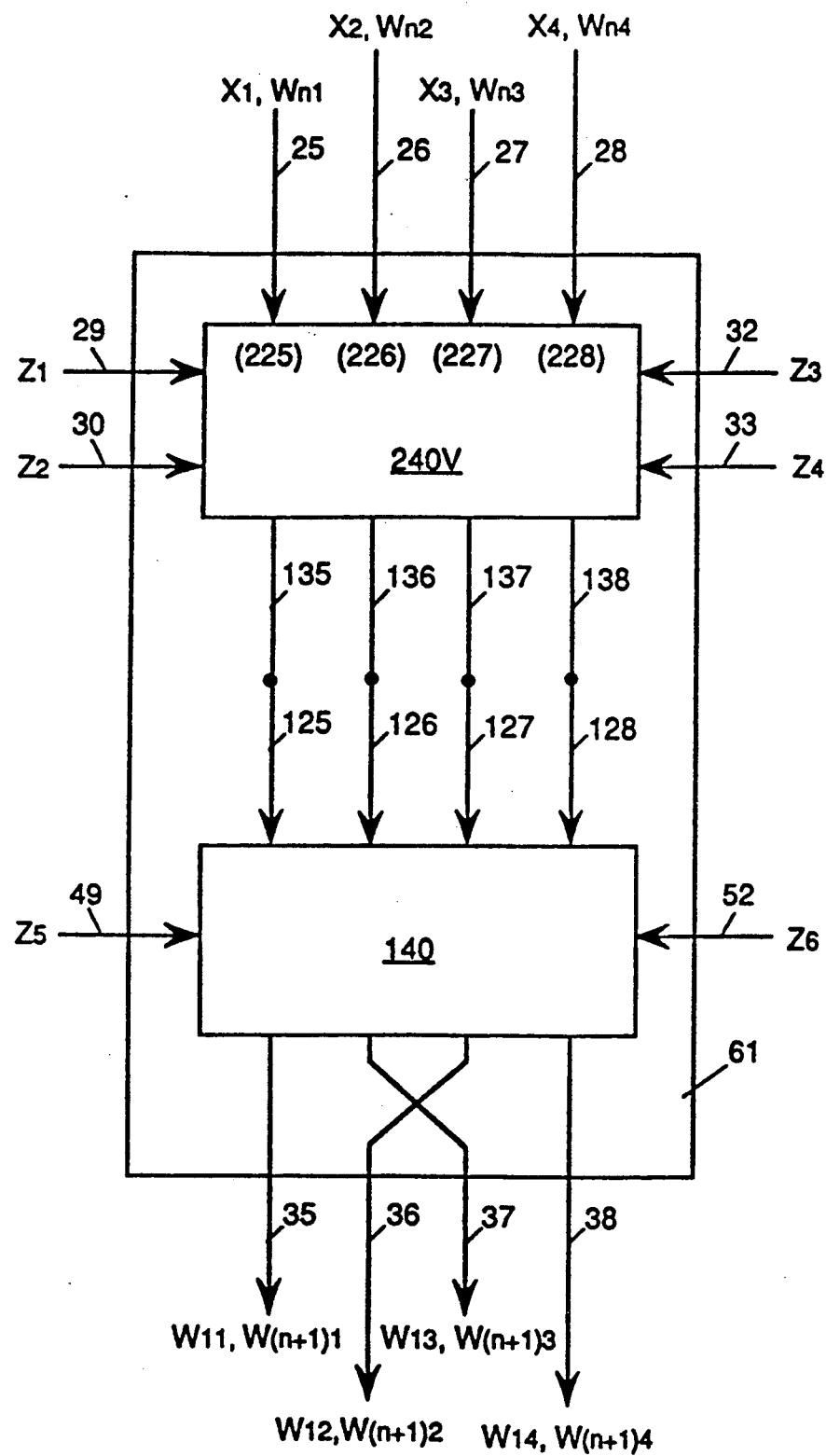
FIG. 12 shows a block wiring diagram of a second encryption stage.

FIG. 12 shows the block wiring diagram of a second encryption stage 61.1v. The latter is formed from the combination of the supplementary encryption logic 240v and an extended encryption logic 140, wherein the outputs 135 to 138 of the logic 240v are (galvanically) connected directly with the inputs 125 to 128 of the following logic 140. The inputs 25 to 28 of the respective encryption stage (61.1v) are identical to the inputs 225 to 228 of the second, supplementary encryption logic 240v. The outputs of the extended logic 140 directly form the outputs 35 to 38 and, when crossed, the outputs 36 and 37 of the encryption stage 61.1v. The remaining construction corresponds completely to that of FIG. 9.

Figure 13:
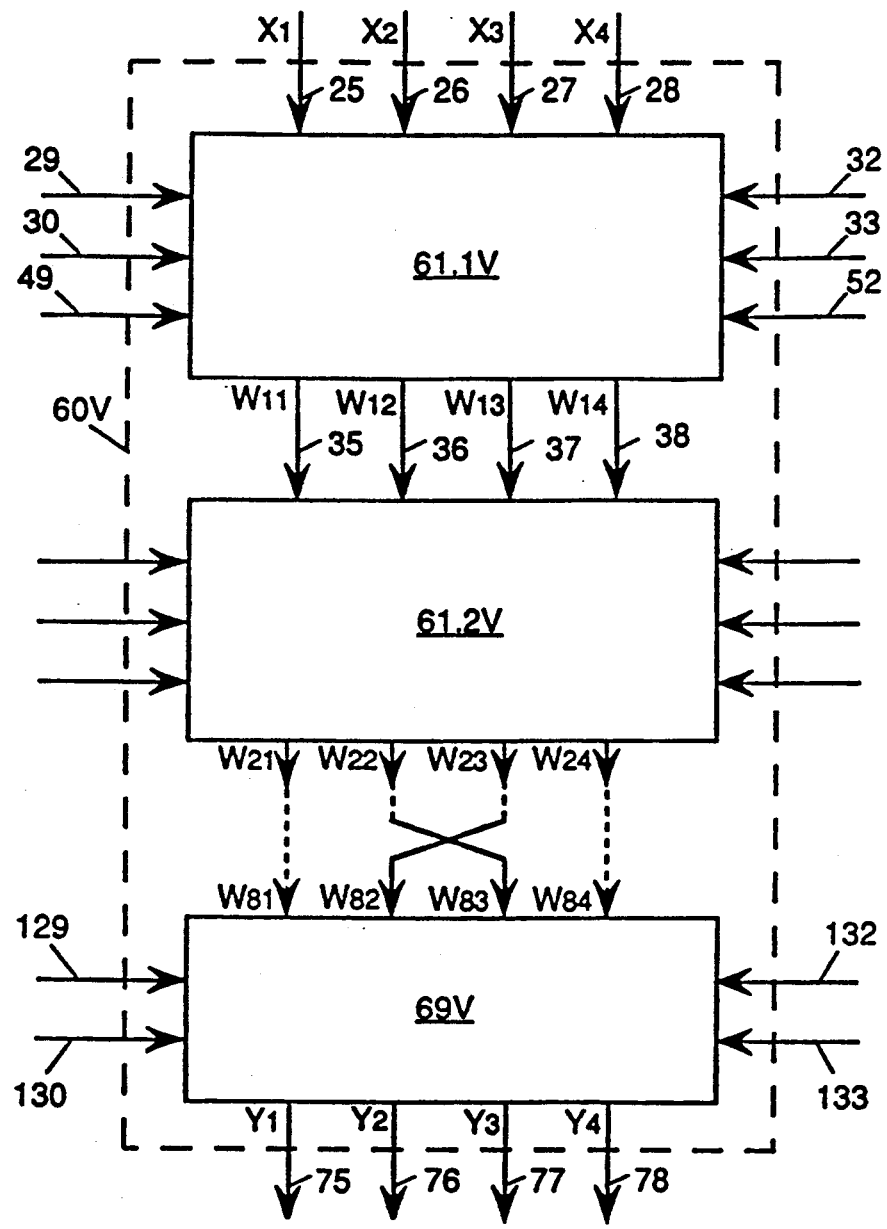
FIG. 13 shows a block wiring diagram of a second encrypter.

FIG. 13 shows the block wiring diagram of a second encryption unit 60v which corresponds to a great extent to FIG. 2. Eight identical second encryption stages 61.1v, 61.2v are connected one after the other in this instance, a second, supplementary encryption logic 240v being connected subsequent to the latter as last stage 69v. The inputs $W_{82}$ and $W_{83}$ are connected in a crossed manner with ... $W_{22}$ and ... $W_{23}$, respectively.

Finally, FIG. 14 shows a second table of key subblocks $Z_n$ and decryption subblocks $U_n$, corresponding to FIG. 10.

During encryption X→Y, as directed above the key subblocks $Z_1$ to $Z_6$ are used, without being altered, in the first stage, the blocks $Z_7$ to $Z_6$ are used in the second stage, and so on. Finally, blocks $Z_{49}$ to $Z_{52}$ are used in the ninth stage.

During decryption Y→X, the following applies for every stage i:

The first and fourth decryption subblocks of every stage i (i=1, 2 ... 9) of the decryption process Y→X are identical to the modulo ($2^{16}+1$) multiplication inverses of the first and fourth key subblocks, respectively, in the (10-i)th stage of the encryption process X→Y. E.g. for the first and fourth decryption subblock $U_1$, $U_4$ of the first stage, this means:

$$U_1 = Z^{-1}{}_{49}; \quad U_2 = Z^{-1}{}_{52}$$

The second and third decryption subblocks in the first and the ninth stage of the decryption process Y→X are the negative values of the modulo $2^{16}$ addition of the second and third key subblock in the ninth and first stage of the encryption process X→Y; E.g. $U_2 = -Z_{50}$, $U_3 = -Z_{51}$.

The second and third decryption subblocks in the ith stage (i=2 ... 9) of the decryption process Y→X are the negative values of the modulo $2^{16}$ addition of the third and second key subblocks in the (10-i)th stage of the encryption process X→Y. E.g. for the decryption subblocks $U_2$, $U_3$ of the first stage, this means:

$$U_8 = -Z_{45}; \quad U_9 = -Z_{44}$$

The fifth and sixth decryption subblocks in the ith stage (i=1, 2 ... 8) of the decryption process Y→X are identical to the fifth and sixth key subblocks, respectively, in the (9-i)th stage of the encryption process X→Y. E.g. for the decryption subblocks $U_5$, $U_6$ of the first stage, this means: $U_5 = Z_{47}$; $U_6 = Z_{48}$.

In this case, also, $Z^{-1}{}_j$ modulo ($2^{16}+1$) multiplied by $Z_j$ is 1. Further, $-Z_j$ modulo $2_{16}$ added to $Z_j$ is 0.

We claim:

1. A device for converting an initial digital block into an assigned final digital block using at least one freely selectable control block, the initial and final digital blocks each having a first number of digits (N), the device comprising:

first input means for receiving at least two initial subblocks, wherein the initial digital block is subdivided to form the initial subblocks, the initial subblocks each having a second number of digits (m);

second input means for receiving at least two control blocks, each control block having the second number of digits (m);

logic means for performing serial operations of at least two different types upon the initial subblocks and the control blocks, the logic means comprising:

at least four operation units, each having first and second inputs for receiving blocks to be operated upon and an output for sending an output block resulting from the logical operation performed, the blocks operated upon and the output block each having the second number of digits (m);

wherein the blocks operated upon by the operation units include the initial subblocks, the control blocks, and the output blocks;

wherein the majority of the operation units are arranged so that the operation unit which operates upon the output block of a previous operation unit performs an operation different from the previous operation unit; and wherein the operation units perform the operations selected from    and    ; and, output means for transmitting at least two final subblocks, the final subblocks forming the assigned final digital block, wherein the final subblocks are converted blocks which correspond to the initial subblocks.

2. The device of claim 1, wherein:

the first input means receives first and second initial subblocks, the second input means receives first and second control blocks, the output means provides for the output of first and second final subblocks, and the logic means performs primary encryption logic, the logic means comprising first, second, third, and fourth operation units which perform operation selected from    and    , and wherein:

the first operation unit performs the    operation on the first initial subblock and the first control block to form a first output block;

the second operation unit performs the    operation on the second initial subblock and the first output block to form a second output block;

the third operation unit performs the    operation on the second output block and the second control block to form the second final subblock; and, the fourth operation performs the    operation on the first output block and the second final subblock to form the first final subblock.

3. The device of claim 1, wherein:

the first input means receives first, second, third and fourth initial subblocks;

the second input means receives first and second control blocks, and;

the logic means performs extended primary encryption logic, wherein the logic means comprises:

a first operation unit for performing the    operation on the first and third initial subblocks to form a first output block;

a second operation unit for performing the    operation on the second and fourth initial subblocks to form a second output block;

central logic means for operating on the first and second output blocks and the first and second control blocks to form third and fourth output blocks;

a third operation unit for performing the    operation on the third output block and the first initial subblock to form a first final subblock;

a fourth operation unit for performing the    operation on the third output block and the third initial subblock to form a third final subblock;

a fifth operation unit for performing the    operation on the fourth output block and the second initial subblock to form a second final subblock; and, a sixth operation unit for performing the    operation on the fourth output block and the fourth initial subblock to form a fourth final subblock.

4. The device of claim 1, wherein:

the first input means receives first, second, third and fourth initial subblocks;

the second input means receives first, second, third, fourth, fifth, and sixth control blocks;

the output means provides for first, second, third and fourth final subblocks, and the logic means performs encryption logic having a first and second stage, wherein the first stage comprises:

a first operation unit performing the    operation on the first initial subblock and the first control block to form a first output block;

a second operation performing the operation on the second initial subblock and the second control block to form a second output block;

a second operation performing the operation on the second plaintext subblock and the second control block to form a second output block;

a third operation unit performing the operation on the third plaintext subblock and the third control block to form a third output block;

a fourth operation unit performing the operation on the fourth plaintext subblock and the fourth control block to form a fourth output block; and the second stage of the encryption logic performs extended primary encryption logic, the second stage comprising:

a fifth operation unit for performing the operation on the first and third output blocks to form a fifth output block;

a sixth operation unit for performing the operation on the second and fourth output blocks to form a sixth output block;

central logic means for operating on the fifth and sixth output blocks and the fifth and sixth control blocks to form seventh and eighth output blocks;

a seventh operation unit for performing the operation on the seventh output block and the first output block to form the third cyphertext subblock;

an eighth operation unit for performing the operation on the seventh output block and the third output block to form the first cyphertext subblock;

a third operation unit performing the operation on the third initial subblock and the third control block to form a third output block;

a fourth operation unit performing the operation on the fourth initial subblock and the fourth control block to form a fourth output block; and the second stage of the encryption logic performs extended primary encryption logic, the second stage comprising:

a fifth operation unit for performing the operation on the first and third output blocks to form a fifth output block;

a sixth operation unit for performing the operation on the second and fourth output blocks to form a sixth output block;

central logic means for operating on the fifth and sixth output blocks and the fifth and sixth control blocks to form seventh and eighth output blocks;

a seventh operation unit for performing the operation on the seventh output block and the first output block to form the third final subblock;

an eighth operation unit for performing the operation on the seventh output block and the third output block to form the first final subblock;

a ninth operation unit for performing the operation on the eighth output block and the second output block to form the fourth final subblock; and, a tenth operation unit for performing the operation on the eighth output block and the fourth output block to form the second final subblock.

5. The device of claim 4, wherein the central logic means performs primary encryption logic, the central logic means comprising eleventh, twelfth, thirteenth, and fourteenth operation units which perform operations selected from and , and wherein:

the eleventh operation unit performs the operation on the fifth output block and the fifth control block to form an eleventh output block;

the twelfth operation unit performs the operation on the sixth output block and the eleventh output block to form a twelfth output block;

the thirteenth operation unit performs the operation on the twelfth output block and the sixth control block to form the eighth output block; and, the fourteenth operation unit performs the operation on the eleventh output block and the eighth output block to form the seventh output block.

6. The device of claim 1, wherein:

the first input means receives first, second, third and fourth initial subblocks;

the second input means receives first, second, third, fourth, fifth, and sixth control blocks;

the output means provides for first, second, third and fourth final subblocks, and the logic means performs encryption logic in first and second stages, wherein the first stage comprises:

a first operation unit for performing the operation on the first initial subblock and the first control block to form a first output block;

a second operation unit for performing the operation on the second initial subblock and the second control block to form a second output block;

a third operation unit for performing the operation on the third initial subblock and the third control block to form a third output block;

a fourth operation unit for performing the operation on the fourth initial subblock and the fourth control block to form a fourth output block; and the second stage of the encryption logic performs extended primary encryption logic, the second stage comprising:

a fifth operation unit for performing the operation on the first and third output blocks to form a fifth output block;

a sixth operation unit for performing the operation on the second and fourth output blocks to form a sixth output block;

central logic means for operating on the fifth and sixth output blocks and the fifth and sixth control blocks to form seventh and eighth output blocks;

a seventh operation unit for performing the operation on the seventh output block and the first output block to form the first final subblock;

an eighth operation unit for performing the operation on the seventh output block and the third output block to form the second final subblock;

a ninth operation unit for performing the operation on the eighth output block and the second output block to form the third final subblock; and, a tenth operation unit for performing the operation on the eighth output block and the fourth output block to form the fourth final subblock.

7. The device of claim 6, wherein the central logic means performs primary encryption logic, the central logic means comprising eleventh, twelfth, thirteenth, and fourteenth operation units which perform operations selected from and , and wherein:

the eleventh operation unit performs the operation on the fifth output block and the fifth control block to form an eleventh output block;

the twelfth operation unit performs the operation on the sixth output block and the eleventh output block to form a twelfth output block;

the thirteenth operation unit performs the operation on the twelfth output block and the sixth control block to form the eighth output block; and, the fourteenth operation unit performs the operation on the eleventh output block and the eighth output block to form the seventh output block.

8. The device of claim 1, wherein:

the first input means receives first, second, third and fourth initial subblocks;

the second input means receives a third number of control blocks (X); and the logic means comprises:

a fourth number of identical stages (Y), each of the stages having four inputs and four outputs and performing identical operations, the four outputs of one stage being connected to the four inputs of the next stage; and, a final stage having four operation units selected from and , for performing four logical operations in a parallel manner to create first, second, third and fourth final subblocks; and the output means transmits the first, second, third and fourth final subblocks, wherein:

the number of control blocks received by the second input is governed by the equation:

$$X = Y + 4; \text{ and}$$

wherein, the first operation unit of the final stage performs the operation on the first output block of the Yth stage and the X-3th control block to form the first final subblock, the second operation unit of the final stage performs the operation on the second output block of the Yth stage and the X-2th control block to form the second final subblock, the third operation unit of the final stage performs the operation on the third output block of the Yth stage and the X-1th control block to form the third final subblock, and the fourth operation unit of the final stage performs the operation on the fourth output block of the Yth stage and the Xth control block to form the fourth final subblock.

9. The device of claim 1, wherein the initial digital block is a readable block and the final digital block is an encoded block.

10. The device of claim 1, wherein the initial digital block is an encoded block and the final digital block is a readable block.

* * * * *

UNITED STATES PATENT AND TRADEMARK OFFICE
CERTIFICATE OF CORRECTION

PATENT NO. : 5,214,703
DATED : May 25, 1993
INVENTOR(S) : James L. Massey

It is certified that error appears in the above-indentified patent and that said Letters Patent is hereby corrected as shown below:

Col. 4, line 23: after "kinds" insert -- ⊞ , ⊙ --;
   line 39: after "kind" insert -- ⊞ --;
   line 49: after "kind" insert -- ⊞ --;
   line 54: after "kind" insert -- ⊙ --; and,
   line 63: after "kind" insert    -- ⊙ --.

Col. 5, line 17: after "kind" insert -- ⊕ --;
   line 29: cancel ",  ," and insert therefor -- ⊞ , ⊙ , ⊕ --;
   line 37: after "kind" insert -- ⊕ --;
   line 43: after "kind" insert -- ⊙ --; and,
   line 44: after "kind" insert -- ⊞ --.

Col. 6, line 16: cancel ",  ," and insert therefor -- ⊞ , ⊙ , ⊕ --; and,
   line 17: cancel ",  ," and insert therefor -- ⊞ , ⊙ , ⊕ --.

Col. 7, line 23: cancel "kinds ," and insert therefor -- kinds ⊞ , ⊙ --;
   line 50: cancel ",  ," and insert therefor -- ⊞ , ⊙ , ⊕ --; and,
   line 55: cancel ",  ," and insert therefor -- ⊞ , ⊙ , ⊕ --.

Col. 8, line 30: before "and two" insert -- ⊙ --; and,
   line 31: before ". Their" insert -- ⊞ --.

Col. 9, line 65: cancel "from  and  and" and insert therefor --from ⊞ and ⊙ and ⊕ --.

UNITED STATES PATENT AND TRADEMARK OFFICE
CERTIFICATE OF CORRECTION

PATENT NO. : 5,214,703
DATED : May 25, 1993
INVENTOR(S) : James L. Massey

Page 2 of 4

It is certified that error appears in the above-indentified patent and that said Letters Patent is hereby corrected as shown below:

Col. 10, line 13: cancel "from   and" and insert therefor --from $\boxplus$ and $\odot$ --;
    line 14: after "performs the" insert -- $\odot$ --;
    line 17: after "performs the" insert -- $\boxplus$ --;
    line 20: after "performs the" insert -- $\odot$ --;
    line 23: after "performs the" insert -- $\boxplus$ --;
    line 33: after "performing the" insert -- $\oplus$ --;
    line 36: after "performing the" insert -- $\oplus$ --;
    line 43: after "performing the" insert -- $\oplus$ --;
    line 46: after "performing the" insert -- $\oplus$ --;
    line 49: after "performing the" insert -- $\oplus$ --;
    line 53: after "performing the" insert -- $\oplus$ --; and,
    line 66: after "performing the" insert -- $\odot$ --.

Col. 11, line 1: after "performing the" insert -- $\odot$ --;
    line 4: after "performing the" insert -- $\odot$ --;
    line 7: after "performing the" insert -- $\odot$ --;
    line 10: after "performing the" insert -- $\odot$ --;
    line 16: after "performing the" insert -- $\oplus$ --;
    line 19: after "performing the" insert -- $\oplus$ --;
    line 25: after "performing the" insert -- $\oplus$ --;
    line 29: after "performing the" insert -- $\oplus$ --;
    line 33: after "performing the" insert -- $\odot$ --;
    line 36: after "performing the" insert -- $\odot$ --;
    line 42: after "performing the" insert -- $\oplus$ --;
    line 45: after "performing the" insert -- $\oplus$ --;
    line 51: after "performing the" insert -- $\oplus$ --;
    line 55: after "performing the" insert -- $\oplus$ --;
    line 59: after "performing the" insert -- $\oplus$ --; and,
    line 63: after "performing the" insert -- $\oplus$ --.

UNITED STATES PATENT AND TRADEMARK OFFICE
CERTIFICATE OF CORRECTION

PATENT NO. : 5,214,703

DATED : May 25, 1993

INVENTOR(S) : James L. Massey

It is certified that error appears in the above-indentified patent and that said Letters Patent is hereby corrected as shown below:

Col. 12, line 2: cancel "from and" and insert therefor --from ⊞ and ⊙ --;
      line 3: after "performs the" insert -- ⊙ --;
      line 6: after "performs the" insert -- ⊞ --;
      line 9: after "performs the" insert -- ⊙ --;
      line 12: after "performs the" insert -- ⊞ --;
      line 24: after "performing the" insert -- ⊙ --;
      line 27: after "performing the" insert -- ⊙ --;
      line 30: after "performing the" insert -- ⊙ --;
      line 33: after "performing the" insert -- ⊙ --;
      line 41: after "performing the" insert -- ⊕ --;
      line 44: after "performing the" insert -- ⊕ --;
      line 50: after "performing the" insert -- ⊕ --;
      line 53: after "performing the" insert -- ⊕ --;
      line 57: after "performing the" insert -- ⊕ --;
      line 61: after "performing the" insert -- ⊕ --; and,
      line 68: delete "from and" and insert therefor --from ⊞ and ⊙ --.

Col. 13, line 1: after "performs the" insert -- ⊙ --;
      line 4: after "performs the" insert -- ⊞ --;
      line 7: after "performs the" insert -- ⊙ --;
      line 11: after "performs the" insert -- ⊞ --; and,
      line 27: delete "from and" and insert therefor --from ⊞ and ⊙ --.

UNITED STATES PATENT AND TRADEMARK OFFICE
CERTIFICATE OF CORRECTION

PATENT NO. : 5,214,703

DATED : May 25, 1993

INVENTOR(S) : James L. Massey

It is certified that error appears in the above-indentified patent and that said Letters Patent is hereby corrected as shown below:

Col. 14, line 9: after "performs the" insert -- $\odot$ --;
       line 13: before "operation" insert -- $\odot$ --;
       line 17: before "operation" insert -- $\boxplus$ --; and,
       line 21: before "operation" insert -- $\boxplus$ --.

Signed and Sealed this

Twentieth Day of February, 1996

Attest:

BRUCE LEHMAN

*Attesting Officer*      Commissioner of Patents and Trademarks